H. C. KRING.
Fender.

No. 219,163. Patented Sept. 2, 1879.

WITNESSES.
Nat. E. Oliphant
Geo. R. Porter

INVENTOR.
Henry C. Kring,
per
Chas. H. Fowler
Attorney.

UNITED STATES PATENT OFFICE.

HENRY C. KRING, OF MONROE, MICHIGAN.

IMPROVEMENT IN FENDERS.

Specification forming part of Letters Patent No. 219,163, dated September 2, 1879; application filed July 7, 1879.

*To all whom it may concern:*

Be it known that I, HENRY C. KRING, of Monroe, in the county of Monroe and State of Michigan, have invented a new and valuable Improvement in Clod-Fenders; and I do hereby declare that the following is a full, clear, and exact description of the construction and operation of the same, reference being had to the annexed drawings, making a part of this specification, and to the letters and figures of reference marked thereon.

Figure 1:
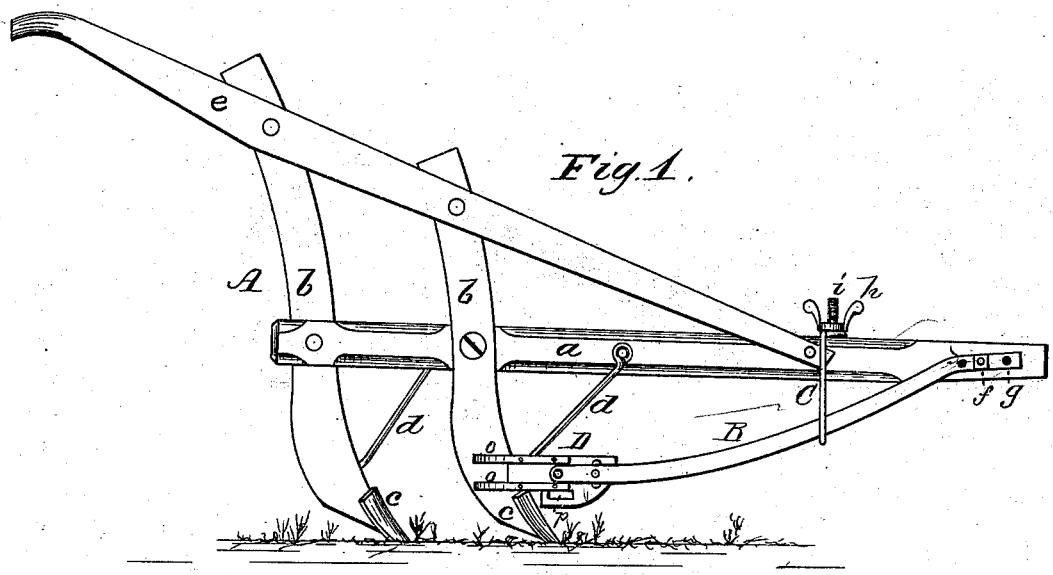
Figure 2:
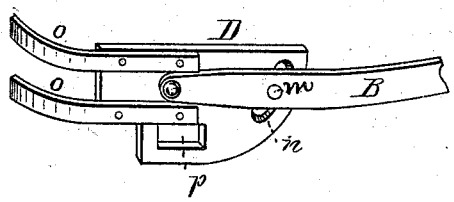
Figure 3:
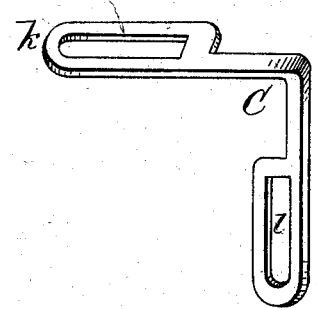

Figure 1 of the drawings is a representation of a side elevation of my invention, showing it connected to a plow. Fig. 2 is a detail view of the slotted end of the fender; and Fig. 3 is a perspective view, on an enlarged scale, of the right-angle slotted bar.

This invention has relation to attachments for plows or cultivators known as "clod-fenders" or "shields," employed for the purpose of keeping clods from rolling or falling onto the young corn; and the object of the present invention is to so construct the device that its effectiveness is greatly increased, and connecting it to the plow-beam, whereby the required degree of adjustment is obtained, as will be hereinafter described, and subsequently pointed out in the claim.

In the accompanying drawings, A represents a cultivator-plow, with the usual beam $a$, to which are connected the uprights $b$ and shovels $c$.

The uprights $b$ are connected, one upon each side of the beam $a$, and braced by wire rods $d$, a suitable handle or handles, $e$, being secured to the plow-beam $a$ and uprights $b$.

To the front end of the plow-beam $a$ is pivoted one end of a curved arm, B, by bolt and nut $f$, passing through one of a series of holes, $g$, in the end of the arm, so that the same can be adjusted in length as required.

The arm B passes through the lower slotted end of a right-angle bar, C, the horizontal portion of said bar being secured to the upper side of the beam $a$ by a thumb-nut, $h$, fitting onto a screw-bolt, $i$, rigidly secured to the plow-beam.

The right-angle bar C, with its slotted ends $k\ l$, will, by its adjustment, regulate the position of the arm B. By sliding the bar horizontally and in a direction at right angles to the plow-beam, the arm will be brought to or from the plow-beam and shovels $c$, and be raised or lowered, as may be found necessary in cultivating corn of different growths.

The arm B, at its free end, has pivoted to it a shield or clod-fender, D, the shield being held at any desired angle with relation to the arm B by set-screw $m$ passing through the arm and a slot, $n$, in the shield D.

The shield D has fender bars or fingers $o$, and has a slot, $p$, below the pivotal end of the arm B. This shield will effectually prevent the lumps from rolling and falling on the corn, or whatever is being cultivated, and at the same time will allow the fine dirt to pass through the slot $p$ and under the lower side of the shield or finger $o$, while the fingers will force the lumps away from the corn, so that they will lodge in the furrow back of the shovels.

The adjustment of the shield D is of great importance, as it can be regulated to suit the condition of the soil, and when the corn is small can be lowered, and the curved arm B also adjusted as circumstances may require.

The cultivator-plow shown and described can be variously modified in its several parts, or any other suitable cultivator or shovel-plow can be substituted, without departing from the principle of my invention, which consists, essentially, of the peculiar form of shield and its adjuncts, as hereinbefore described.

I am aware that it is not new to attach fenders to plows by an adjustable gravitating arm, or to form them with openings to admit the passage of fine earth, and with vertical or other adjustments, and hence I only claim my special construction and combination of devices.

Having now fully described my invention, what I claim as new, and desire to secure by Letters Patent, is—

The combination of the curved arm B, adjustably pivoted to the beam $a$ at its outer end, and the angular bar C, having slots $k\ l$, screw $i$, and thumb-nut $h$, with the slotted shield D, pivoted to the inner end of the arm B, and provided with the curved fingers $o\ o$, and slot $n$ and set-screw $m$, for angularly adjusting the shield, the whole constructed and arranged to operate in the manner and for the purpose set forth.

In testimony that I claim the above I have hereunto subscribed my name in the presence of two witnesses.

HENRY C. KRING.

Witnesses:
C. H. JOHNSON,
GEO. M. LANDON.